(No Model.)

R. DUTTON.
MOWING MACHINE.

No. 271,819. Patented Feb. 6, 1883.

WITNESSES:

INVENTOR:
Rufus Dutton,
by J. Russell Parsons Atty.

UNITED STATES PATENT OFFICE.

RUFUS DUTTON, OF YONKERS, NEW YORK.

MOWING-MACHINE.

SPECIFICATION forming part of Letters Patent No. 271,819, dated February 6, 1883.

Application filed May 31, 1882. (No model.)

*To all whom it may concern:*

Be it known that I, RUFUS DUTTON, a citizen of the United States, residing at Yonkers, in the county of Westchester and State of New York, have invented a new and useful Improvement in Mowing-Machines; and I do hereby declare that the following is a full, clear, and exact description of the invention, which will enable others skilled in the art to which it appertains to make and use the same, reference being had to the accompanying drawings, making a part of this specification, in which—

Figure 1:
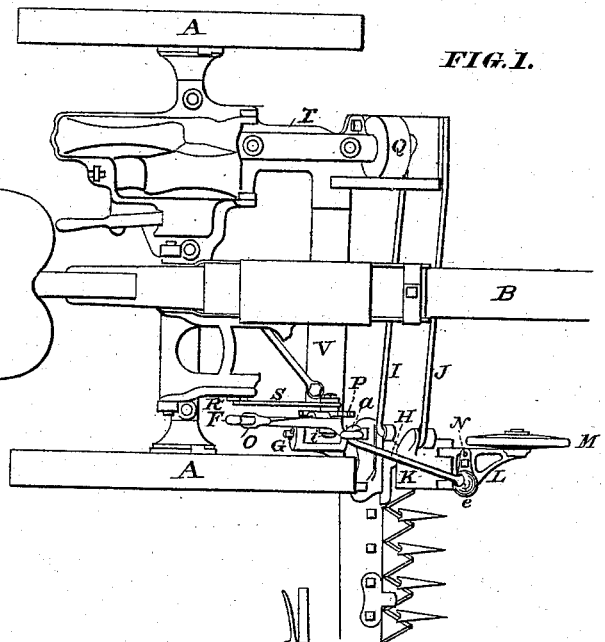
Figure 2:
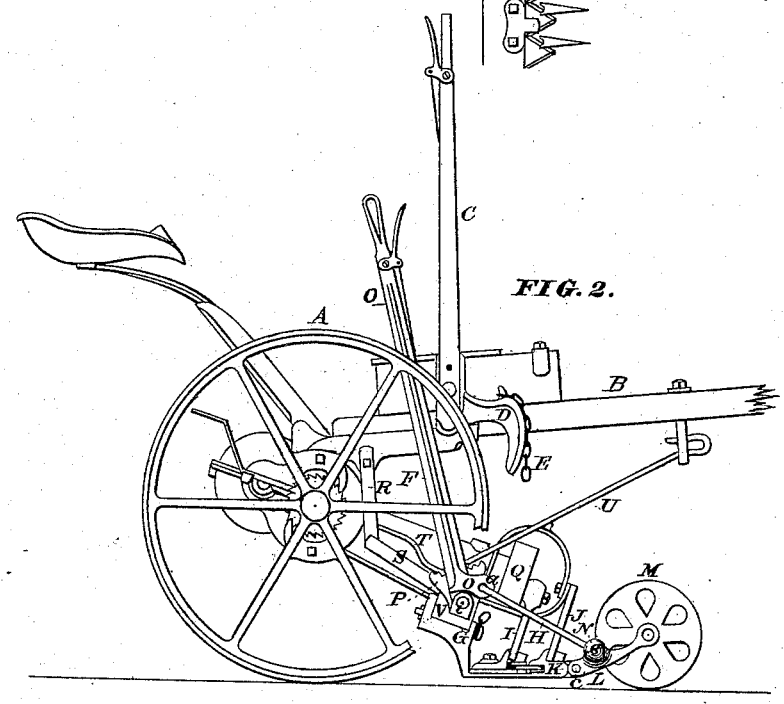

Figure 1 is a plan view, and Fig. 2 is a side elevation, of a mowing-machine, showing my improvement.

In the drawings the several letters refer to the same parts in the respective figures.

The nature and object of my invention are to provide a means by which the driver in his seat can change the position in which the cutters are presented to the crop to be cut, in order to cut the whole crop and leave a smooth stubble without stopping the machine; and in this specification my improvement is applied to a front-cut drooping-frame machine, where a leading-wheel is used. The same or a similar arrangement can be readily applied to other forms; and I do not deem it necessary here to show any other form of construction, nor do I wish to limit myself to the particular construction or class of mowing-machines shown and described in the specification and drawings.

A A are the main driving and supporting wheels of the machine, mounted one upon each end of a common axle, and turn loosely thereon, and provided with a pawl and spring which engage with ratchet-teeth on a hub which is fast to the axle, so that when the machine is moved forward the pawl of each driving-wheel will engage with the ratchet-teeth on the axle and give motion independently of each other to the axle, and when a backward movement is given to either of the driving-wheels its pawl will slip by the ratchet-teeth and impart no motion to the axle. Motion is imparted in any of the well-known ways from the axle by suitable gearing to the cutters.

Upon the axle is hinged the frame T, which extends forward and downward and supports the gearing, and at its forward end supports the shoe G L, which shoe supports and carries the finger-bar and cutting apparatus.

At or near the axle is hinged the tongue or pole frame B, to which the team is attached, and at its rear end supports the driver's seat.

To the tongue-frame, and in convenient distance from the driver, is pivoted the lever C, which is provided with a sector-shaped casting, D, to which is hooked a chain which extends downward and is fastened to the gear-frame. This lever is provided with a spring hand-latch and rod, the lower end of which is provided with a pawl which engages with ratchet-teeth of a segment fastened to the pole-frame, by means of which the driver can raise and hold up at different heights the cutting apparatus.

Back of the lever and between the same and the axle is hinged the flat bar R, and to the lower end of the bar R is pivoted the bar S, its lower end being hinged to the frame, and a projection extends from the shoe G, which strikes against the bar S when it is raised. By this arrangement when the lever C is drawn back by the driver the outer end of the finger-bar is raised as soon as the projection strikes the bar S. The shoe G is hinged at its rear end to the end of a flat spring, V, by an eye and bolt. This spring extends upward to the outer or stubble side of the frame, and is fastened thereto.

I is the pitman, which connects the crank-pin on balance-wheel Q with the cutters.

J is a strong rod, which is also hinged to the shoe at its lower end, and is bolted firmly to the shield of the balance-wheel at its upper end and serves to aid in keeping the shoe in position as well as affording a protection to the pitman from stones or other obstructions.

It will be seen that this construction allows the finger-bar and cutting apparatus to be turned up, and, when so turned, can be held up against the machine by a latch or rested against the pole-frame for transportation from field to field.

U is a draft-rod at whose upper and forward end are attached evener and whiffle trees by which the machine is drawn. This rod passes through a loop which extends downward from the pole, and its lower end is attached to the frame. By this arrangement of drawing the machine the friction of the bar on the ground is lessened.

M is the leading-wheel, which is placed at the front end of the shoe, and is so arranged by a slotted connection with the shoe (not shown in the drawings) that it can be set higher or lower to vary the height of cut. The shoe at the outer end of the finger-bar (not shown in the drawings) is also provided with an adjustable supporting-wheel, which also serves to adjust the height of cut at the outer end of the finger-bar.

It is plain that in order to change the height of cut (except so far as it may be accomplished by the arc of the lever C and its connections, which only admit of raising from the ground the leading-wheel with the shoe) it is necessary to stop the machine and change the adjustment of the leading-wheel. This change is required to be made frequently in certain kinds of crops for a short distance. For instance, in a field to be cut there occurs a short space of lodged clover or other grass, and in order to cut the whole crop it is necessary to get the points of the guard-fingers down to get under it, when, if so set on the start, they would be too low for the balance of the crop. It is to provide for this requirement that I attach my improvement.

I construct the shoe G L in two parts, fastening these two parts at c by a joint, and between the joint and the leading-wheel I attach to the shoe a rod, H. This rod is attached to the shoe by a universal joint, N, and extends back, and is attached to a short arm of a lever, a, which is attached to the long arm of a lever, O, which is pivoted to a projection of the shoe at i, which is provided with notches into which works a pawl, which is connected with a rod, which passes upward along the lever, and is provided with a hand-latch and spring, and the lever and hand-latch are within reach of the driver, so that by grasping the handle of the lever the driver can raise or depress the cutters within certain limits without leaving his seat.

In the class of machines shown and described herein the movement attained in raising and lowering the cutters is in the arc of a circle having the axle for a center and the distance from the axle to the axle of the leading-wheel the radius, so that the points of the guard-fingers are raised or depressed more than their rear or heel ends when the bar is raised or lowered, whether it be by one adjustment or the other.

The object of the universal joint N is to allow the bar to work freely on its joints where it is attached to the shoe, and to allow it to be turned up for transportation.

Having thus fully described my invention, what I claim as new, and desire to secure by Letters Patent, is—

1. The combination of a main shoe, which supports the finger-bar, jointed between the leading-wheel and the finger-bar, with a lever within reach of the driver, to adjust the height of cut, substantially as and for the purpose described.

2. The combination of a wheel-carrying main shoe, hinged in front of the cutter-bar, with a lever connected with the wheel-carrying portion of said shoe and extending within reach of the driver, to adjust the height of cut, substantially as described.

3. The combination of a main shoe, which supports the finger-bar, jointed between the leading-wheel and finger-bar by a cross-hinge, with a lever, within reach of the driver, pivoted upon the frame of the machine, such lever being connected by a rod with a universal joint to that part of the shoe in front of the cross-hinge, which joint permits the finger-bar to be raised and folded for transportation without cramping, substantially as described.

4. The combination of a main shoe, to support the finger-bar, jointed by a cross-hinge, and a lever, within reach of the driver, connected by a rod with a universal joint to the shoe in such manner that the rod shall cross the vertical plane of the cross-hinge, substantially as described.

RUFUS DUTTON.

Witnesses:
DAVID SCOTLAND,
MARVIN A. OAKLEY.